Jan. 24, 1967    C. D. BOADLE ET AL    3,299,976
COMPACT VEHICLE WEIGHBRIDGE WITH TRANSVERSE
AND HORIZONTAL RESTRAINTS
Filed Oct. 20, 1964
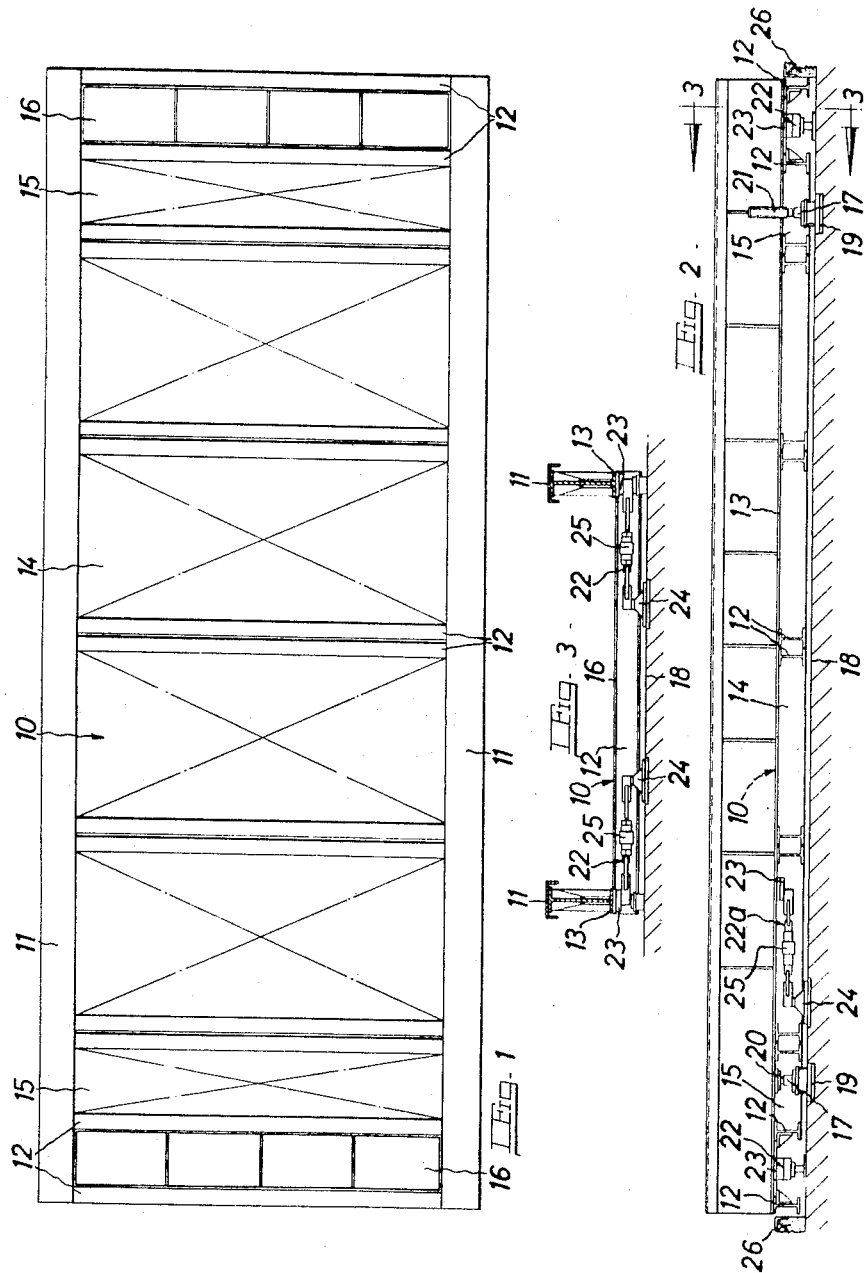
Campbell Dean Boadle +
Dagwell James Morgan
By Scrivener Parker Scrivener & Clarke

United States Patent Office 3,299,976
Patented Jan. 24, 1967

3,299,976
COMPACT VEHICLE WEIGHBRIDGE WITH TRANSVERSE AND HORIZONTAL RESTRAINTS
Campbell Dean Boadle, Caerleon, and Dagwell James Morgan, Borrowash, England, assignors to Girling Limited, Birmingham, England, a British company
Filed Oct. 20, 1964, Ser. No. 405,118
6 Claims. (Cl. 177—134)

This invention relates to improvements in weighbridges for weighing vehicles. With such weighbridges it is usual to arrange for vehicles to be driven on to a weighing deck the surface of which is flush with the road surface, the weighing mechanism being housed in a rectangular pit below the deck. Weighbridges of this type are often required to weigh heavily laden vehicles and the deck and weighing mechanism are usually of considerable strength and bulk requiring a deep pit in the road surface to accommodate them. Alternatively the deck of a weighbridge may be disposed above the level of the road surface and may be provided with a ramp at each end for transferring vehicles, but this arrangement is inconvenient because the height of the weighbridge necessitates the use of very steep or very long ramps. Weighbridge decks are generally rectangular in shape and supported on a framework of longitudinal and transverse beams below the surface of the deck. The longitudinal beams are usually of deep section and the weighing mechanism of the mechanical type of weighbridge has considerable bulk so that this type require a deep pit, usually of the order of 5 or 6 feet. Electrical weighbridges offer a considerable advantage over mechanical type since the load cells required with the electrical weighbridges take up much less space than the weighing mechanism of the mechanical type and for an electrical weighbridge of the same capacity as before a pit of about 3 feet in depth would suffice.

According to the invention we now proposed a weighbridge comprising a weighing deck, support beams for the deck and weight responsive means associated with the support beams, the deck being suspended from the beams.

The deck is of channel section and the overall depth of the weighbridge from the weighing deck to the base is considerably reduced as compared with the conventional weighbridge where the support beams are below the level of the deck.

The weight responsive means or weighing mechanism is preferably of the electrical type comprising a number of spaced load cells supporting the weighbridge, and according to a feature of the invention horizontal restraints in the form of pivoted tie-rod are provided to restrain horizontal movement of the weighbridge.

With an electrical weighbridge according to the invention the depth may be sufficiently small to allow the weighbridge to be used without bedding the weighing mechanism and deck in the usual pit but arranging for them to be supported directly on a flat surface and providing a shallow ramp at each end to bridge the height betweeen the surface and the deck. This leads to a considerable saving in installation costs since no pit is required. All that is required are local concrete foundations for the load cells and horizontal restraint mountings. A weighbridge of this type could easily be moved from one location to another causing very little disruption to the surfaces on which it is to be installed or from which it is to be removed.

One embodiment of the invention will now be described, by way of example only, referene being made to the accompanying drawings in which:

FIGURE 1 is a plan view of a weighbridge according to the invention;

FIGURE 2 is an elevation of the weighbridge shown in FIGURE 1, part of a mounting ramp being shown at each end of the weighbridge; and FIGURE 3 is a sectional view taken generally on the line 3—3 of FIGURE 2.

The embodiment illustrated comprises an above-ground type weighbridge having a platform or deck 10, 30 feet in length and 10 feet in width, suitable for weighing vehicles having a laden weight of up to 30 tons to an accuracy of the order of one part in four thousand.

The weighbridge comprises a pair of spaced parallel I-section beams 11 arranged with their webs vertical and joined at spaced intervals by a number of transverse rolled steel joists 12. The joists 12 are secured by suitable means to the lower flanges 13 of the beams 11 and precast reinforced concrete slabs 14, 15 carried between the joists 12 form the main portion of the weighbridge deck. At each end of the weighbridge a section of the deck surface is formed by removable steel deck-plates 16 supported on the joists.

The weighing mechanism of the weighbridge is of the electrical type and comprises a load-cell 17 arranged to act between the underside of each end of each beam 11 and a supporting surface 18. The load cells are readily accessible from the sides of the weighbridge and are mounted on smal local foundations 19 in the surface 18. The weight supported at each corner of the weighbridge may act on the load cell through a pad or bearer 20 (as shown at the left hand end of FIGURE 2) or through a roller (not shown), but we prefer to provide a strut 21 (as shown at the right hand end of FIGURE 2) to transmit the vertical force to the load cell. The strut 21 is capable of articulation or angular movement relative to the load cell axis and to the weighbridge to prevent or minimise side loading of the load cells. By providing struts 21 load cell wear is reduced and weighing accuracy is maintained close to the desired fineness.

To minimize horizontal movement of the weighbridge and hence reduce side loading of the load cells a number of horizontal restrains 22, 22a are provided. These basically comprise tie-rods which oppose horizontal movement of the weighbridge without effecting vertical movement under load. At each end of the weighbridge a pair of horizontal restraints are arranged transversely and each is pivoted at one end to a bracket 23 mounted on the underside of the flange 13 of beam 11 and at the other end to fixed pivotal mounting 24 set in the supporting surface 18. Access to the transverse restraint is gained on removal of the steel dacking plates 16 and the horizontal position of the weighbridge can be altered by means of a turnbuckle type adjuster 25 provided on each restraint. To oppose horizontal movement of the weighbridge in a longitudinal direction a pair of restraints 22a are provided beneath the beams 11 near the left hand end of the weighbridge. In the embodiment illustrated the struts 21 shown at only the right hand end of the weighbridge accommodate slight variations in the position of this end caused by thermal expansion or contraction of the weighbridge.

The effects of transverse thermal expansion of the weighbridge are negligible and transverse restraints 22 can be provided at each side of the weighbridge. In the longitudinal direction, however thermal expansion is a problem and hence longitudinal restraints 22a are provided at the left hand end only.

By mounting the longitudinal beams 11 above the level of the weighbridge deck 10 and by employing electrical weighing means disposed beneath the beams 11 in the thickness of the deck 10, the overall height of the deck above the supporting surface 18 is reduced, in the present example to 10 or 12 inches. Mounting ramps 26 are provided on the surface 18 at each end of the weighbridge to enable vehicles to be transferred. Since the height to be bridged is small these ramps will be comparatively short.

When a vehicle or other body is placed on the weighbridge deck each load cell is compressed and emits an electrical response or signal proportional to the load supported. The weight of the body on the weighbridge can readily be obtained by adding the weight signal from each of the load cells in a known manner.

In an alternative embodiment the load cells are not mounted at the ends of the beams but are spaced from the ends of the beams by about one-sixth of the beam length.

It will be appreciated that, although it may be found more convenient to set the weighbridge on the ground with the deck approached by short ramps, the weighbridge could instead be carried in a shallow pit with the deck at ground level.

We claim:

1. A weighbridge comprising a weighing deck suspended from support beams, weight responsive means operatively associated with said support beams and comprising four load cells spaced in rectangular fashion on which the weighbridge is carried, the weighbridge acting on each of at least two of the load cells near one end of the weighbridge through an axially disposed strut arranged in compression between the weighbridge and the load cell, and a number of horizontal restraint means arranged longitudinally and transversely of the weighbridge and each comprising an adjustable tie-rod pivotally mounted at one end to the weighbridge and at the other end to a fixed pivotal mounting, longitudinally arranged tie-rods being provided only in the region of the end of the weighbridge remote from said one end.

2. A weighbridge comprising a deck carried on support beams disposed above the level of the deck, electrical weighing means comprising four load cells arranged in rectangular fashion near the ends of the weighbridge, the weighbridge being supported on each of the two load cells near one end through an axially disposed strut in compression between the weighbridge and the load cell, a number of transversely and longitudinally arranged horizontal restraints each comprising an adjustable tie-rod pivotally mounted at one end to the weighbridge and at the other end to a fixed pivotal mounting, longitudinally arranged restraints being provided only at an end of the weighbridge remote from an end where the struts are situated.

3. A weighbridge comprising but one pair of support beams having undersurfaces and arranged side-by-side and spaced apart, a deck adapted to receive the whole of a load to be weighed comprising cross-beams extending between said support beams and secured to said undersurfaces of said support beams so that said deck is suspended from said support beams, deck-members arranged between, and carried by, said cross-beams and forming therewith a surface to receive said load, weighing means comprising load-cell means operatively engaged respectively, by said undersurfaces of said support beams, said weighing means being disposed substantially within the thickness of said cross-beams, whereby the height of said surface to receive said load above a supporting formation is minimal.

4. A weighbridge comprising a deck carried on support beams disposed above the level of the deck and secured thereto to form a channel-like structure, weighing means comprising a plurality of load cells operatively engaged by the weighbridge support beams and disposed within the thickness of the weighing deck, whereby the overall height between the surface of the weighing deck and a supporting formation is minimal, and horizontal restraint means comprising transversely and longitudinally arranged tie-rods each pivotally connected at one end to the weighbridge and at the other end to a mounting fixed relative to said supporting formation, longitudinally arranged tie-rods being provided at only one longitudinal location on the weighbridge.

5. A weighbridge according to claim 4 in which each tie-rod includes a turnbuckle adjuster.

6. A weighbridge according to claim 4 wherein the weighbridge is supported on each of those load cells remote from said one longitudinal location through an axially disposed strut in compression between the weighbridge and the load cell and capable of angular movement with respect to the weighbridge and the load cell.

References Cited by the Examiner

UNITED STATES PATENTS

| | | | |
|---|---|---|---|
| 2,673,082 | 3/1954 | Thurston | 177—135 |
| 2,742,278 | 4/1956 | Carleton | 177—211 XR |
| 2,793,851 | 5/1957 | Ruge | 177—211 |
| 2,868,570 | 1/1959 | Hines et al. | 177—211 XR |
| 2,962,275 | 11/1960 | Thurston | 177—211 |
| 2,962,276 | 11/1960 | Thurston | 177—211 XR |
| 3,196,965 | 7/1965 | Schramm | 177—133 |

FOREIGN PATENTS

| | | |
|---|---|---|
| 888,571 | 1/1962 | Great Britain. |
| 247,749 | 12/1947 | Switzerland. |

RICHARD B. WILKINSON, *Primary Examiner.*

LEO SMILOW, *Examiner.*

R. S. WARD, JR., *Assistant Examiner.*